(12) United States Patent
Dutta et al.

(10) Patent No.: US 7,266,522 B2
(45) Date of Patent: Sep. 4, 2007

(54) METHOD AND SYSTEM IN ELECTRONIC COMMERCE FOR UNIQUELY IDENTIFYING PRODUCTS TO IMPROVE RELIABILITY AND CONFIDENCE IN TRANSACTIONS INITIATED ONLINE

(75) Inventors: Rabindranath Dutta, Austin, TX (US); Karthikeyan Ramamoorthy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 691 days.

(21) Appl. No.: 09/732,482

(22) Filed: Dec. 7, 2000

(65) Prior Publication Data

US 2002/0073008 A1    Jun. 13, 2002

(51) Int. Cl.
*G06Q 40/00* (2006.01)
(52) U.S. Cl. .................. 705/37; 705/27; 705/35; 705/39; 382/100; 463/29; 345/55
(58) Field of Classification Search ............. 705/39, 705/37, 35, 27, 28; 713/200; 714/5; 463/29; 345/55; 382/100
See application file for complete search history.

(56) References Cited

U.S. PATENT DOCUMENTS 5,870,723 A * 2/1999 Pare et al. ............... 705/39
5,890,140 A * 3/1999 Clark et al. .............. 705/35
6,202,051 B1 * 3/2001 Woolston ................. 705/27
6,260,024 B1 * 7/2001 Shkedy .................... 705/37

OTHER PUBLICATIONS

Alan L. Eliason "Online Business Computer Applications", 2nd Edition, 1987 total of 25 page.*
PR Newswire "David Akers Numismatics Inc. Introduces AkersCoin.com, Encompassing he First Electronic Rare Coin Catalog to Appear in Actual Catalog Format", PR Newswire, New York; Jul. 9, 1999, p. 1.*

* cited by examiner

*Primary Examiner*—Harish T. Dass
(74) *Attorney, Agent, or Firm*—Hamilton & Terrile, LLP

(57) ABSTRACT

A method, apparatus, system, or computer program product facilitates trustworthy electronic commerce by providing a methodology for uniquely identifying a product offered for sale online so as to improve the trustworthiness of a purchase that was initiated electronically. A product for sale in an online auction has a unique, tamper-resistant, physical tag applied to the product, after which the product or object is photographed, either as a digital image or a traditional photograph. The image of the product is then sent to the buyer in some manner. Assuming the buyer agrees to buy the product, the buyer eventually receives the product, presumably with the physically attached, tamper-resistant, tag. The buyer then has increased confidence both before and during the exchange of the product that the product is identical to the product that was described via the image of the product.

30 Claims, 4 Drawing Sheets

METHOD AND SYSTEM IN ELECTRONIC COMMERCE FOR UNIQUELY IDENTIFYING PRODUCTS TO IMPROVE RELIABILITY AND CONFIDENCE IN TRANSACTIONS INITIATED ONLINE

BACKGROUND OF THE INVENTION

1. Field of the Invention

The present invention relates to an improved data processing system and, in particular, to a method and system for automated electrical business practice. Still more particularly, the present invention provides a method and system for facilitating an electronic commerce transaction for physical goods using an online auction service.

2. Description of Related Art

The amount of digital commerce has increased enormously with the growth of the Internet. With the rapid expansion of electronic commerce, the incidence of fraud for online commerce transactions has started to rise for both auction transactions and traditional sales transactions. Fraud can be present during an online transaction whether or not the transaction is between private individuals, commercial entities, or both, and whether or not the transaction occurs through a public click-and-order Web site, an online auction Web site, or some other type of electronic exchange.

An electronic transaction for physical goods between two physically distant parties clearly increases the potential for fraud by removing the immediate physical inspection and transport of goods that occurs during traditional sales transactions. Assuming that a buyer has received some description of the goods that someone has offered for sale, a buyer that participates in an online transaction is much more likely to be struck by the old practice of "bait and switch". In some cases, the seller might not ship the goods that the buyer expected to receive or, possibly, does not ship any goods at all. In less serious cases, the buyer may receive the correct goods but not in the condition that was expected because the appearance of the received goods simply does not match an appearance of the goods within a previously received digital image. In any case, the buyer generally has very limited ability to correct the fraud.

An electronic transaction for physical goods between two physically distant parties is inherently difficult as the buyer and the seller must exchange information concerning the goods without an immediate physical inspection of the goods. With the growth of the Internet, the exchange of information has increasingly occurred on the World Wide Web rather than through mail catalogs, brochures, letters, etc. Various electronic services have become available to facilitate sales by allowing a buyer and a seller to visual inspect digital images of the goods. For example, one corporation provides server software that allows a buyer to visually inspect a product by easily and quickly magnifying detailed digital images of a product without requiring massive amounts of digital data to be sent to the buyer. Another corporation provides client-server software that allows a buyer to visually inspect a product by browsing so-called 360-degree images.

Although a seller also enters into an online transaction with some risk, most of the risk lies with the buyer. Digital images sent by a seller to a buyer through e-mail or provided through an online auction service, or even photographs sent by regular mail, may induce the buyer to enter into a purchase transaction. A buyer of the goods relies on the description of the goods that is provided by the seller. While digital image software enhances the exchange of information, images of goods are not necessarily representative of the physical goods that are shipped by the seller, and it can be quite difficult for the buyer to verify that the product description accurately reflects the appearance of the goods that are in the possession of the seller.

In order to protect two physically distant parties that are participating in an electronic transaction for physical goods and to facilitate the transaction, various types of electronic services have been developed. One type of electronic service is an electronic escrow service, which operates in a manner similar to traditional escrow services in which money or property is placed in the custody of a third party until a specified condition has been fulfilled. For example, an electronic escrow service holds electronic funds, such as credit card transactions, electronic cash payments, etc., until the transaction parties are satisfied with the physical exchange of goods associated with the electronic financial transaction. However, electronic escrow services do not eliminate all potential types of fraudulent behavior. For example, a buyer may receive the goods that are similar to what was promised to be delivered, and while the buyer may return the goods and notify the escrow service, the buyer may still lose a percentage of the purchase price as an escrow fee.

Other types of electronic services are more indirect. For example, one electronic service allows buyers to provide feedback on sellers by rating the sellers, and the buyers can generally assume that if a seller is highly rated, then the seller is more trustworthy or reliable. It would be expected that buyers would be more motivated to enter into online transactions with sellers with higher ratings.

As another example of a service that is partially delivered in an electronic manner, a buyer may receive from the electronic service a certified appraisal for an expensive item that has been examined by an accredited appraiser. Receipt of a certified appraisal should provide the buyer with some confidence that the seller at least has possession of goods that match a description that has been received buy the buyer. While each of these methods provides some assurance to the buyer that the goods that are purchased in an online transaction are more likely to be what is expected by the buyer, especially an expectation that has been based on a description of the goods that has been received from the seller, a buyer may still not receive goods that match the description of the goods that is provided by the seller.

Therefore, it would be advantageous to provide a method and system for minimizing disputes between two physically distant parties that are participating in an electronic transaction for physical goods. It would be particularly advantageous to provide a method and system that is economically efficient for both the buyer and the seller in the transaction.

SUMMARY OF THE INVENTION

A method, apparatus, system, or computer program product facilitates trustworthy electronic commerce by providing a methodology for uniquely identifying a product offered for sale online so as to improve the trustworthiness of a purchase that was initiated electronically. A product for sale in an online auction has a unique, tamper-resistant, physical tag applied to the product, after which the product or object is photographed, either as a digital image or a traditional photograph. The image of the product is then sent to the buyer in some manner. Assuming the buyer agrees to buy the product, the buyer eventually receives the product, presumably with the physically attached, tamper-resistant, tag. The buyer then has increased confidence both before and during the exchange of the product that the product is identical to the product that was described via the image of the product.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

The present invention provides a method and system for allowing a buyer and a seller to rely upon an tagging of goods involved in a online transaction. The tagging methodology is integrated with an electronic commerce service. Therefore, as background, a typical organization of hardware and software components within a distributed data processing system is described prior to describing the present invention in more detail.

Figure 1A:
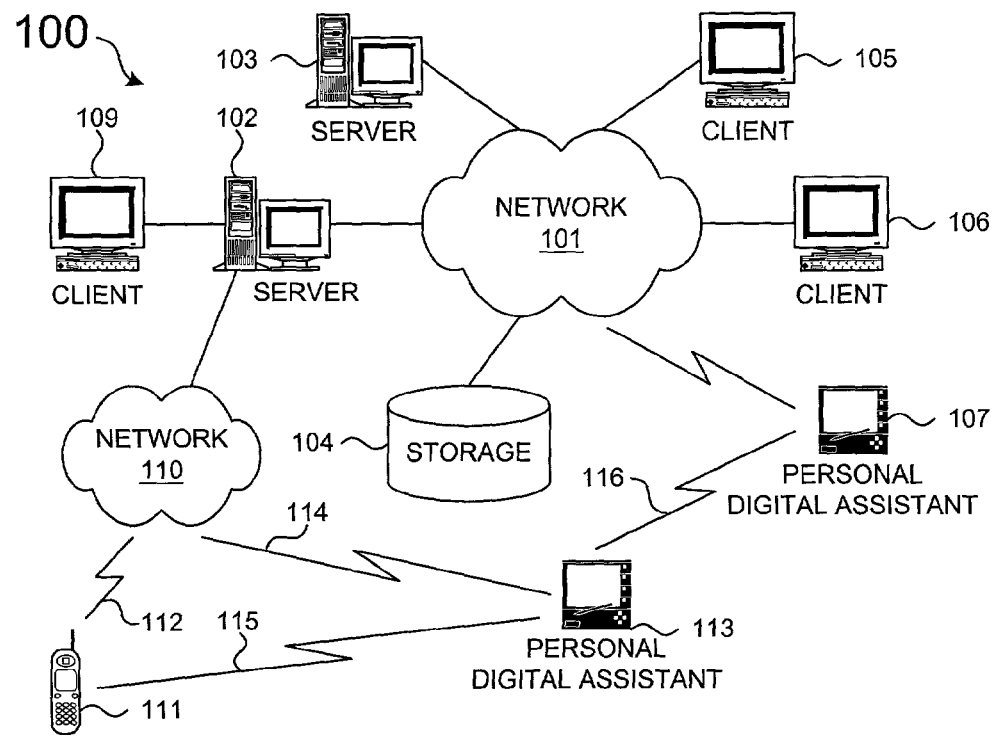
FIG. 1A depicts a typical distributed data processing system in which the present invention may be implemented.

With reference now to the figures, FIG. 1A depicts a typical network of data processing systems, each of which may implement the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, and other devices that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
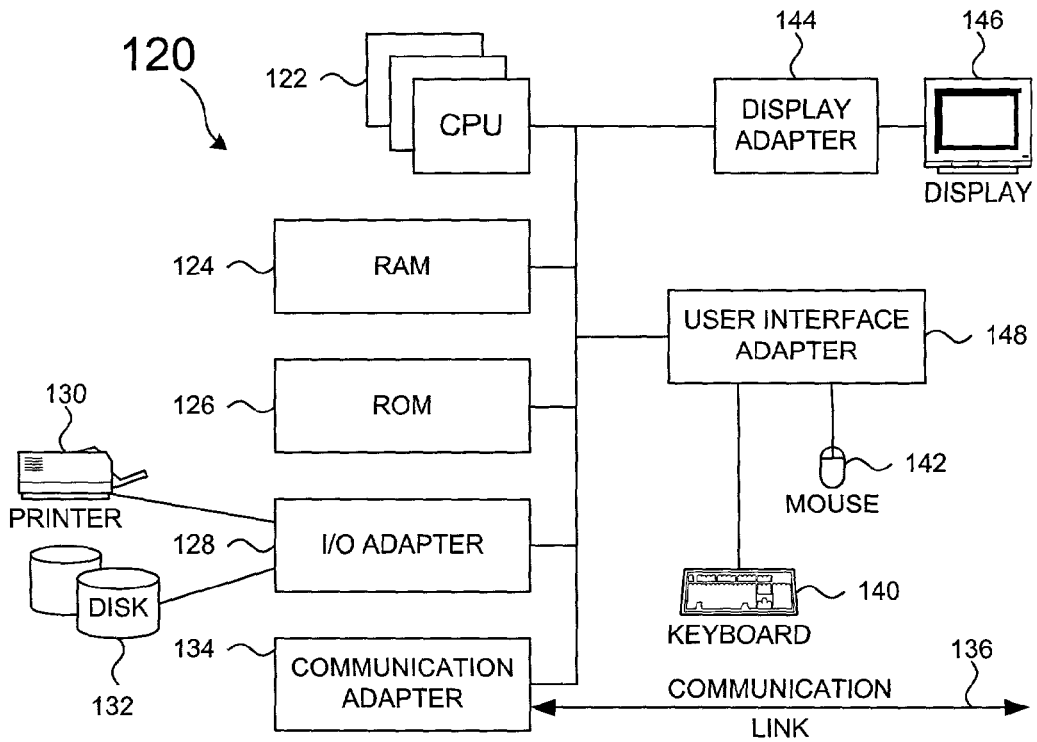
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. In other words, one of ordinary skill in the art would not expect to find similar components or architectures within a Web-enabled or network-enabled phone and a fully featured desktop workstation. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above. More specifically, though, the present invention is directed to providing a method and system in electronic commerce for uniquely identifying physical products exchanged in a purchase transaction that is initiated and/or substantially completed online, as described in more detail below. As background, a typical electronic auction service is described prior to describing the present invention in more detail.

Figure 1C:
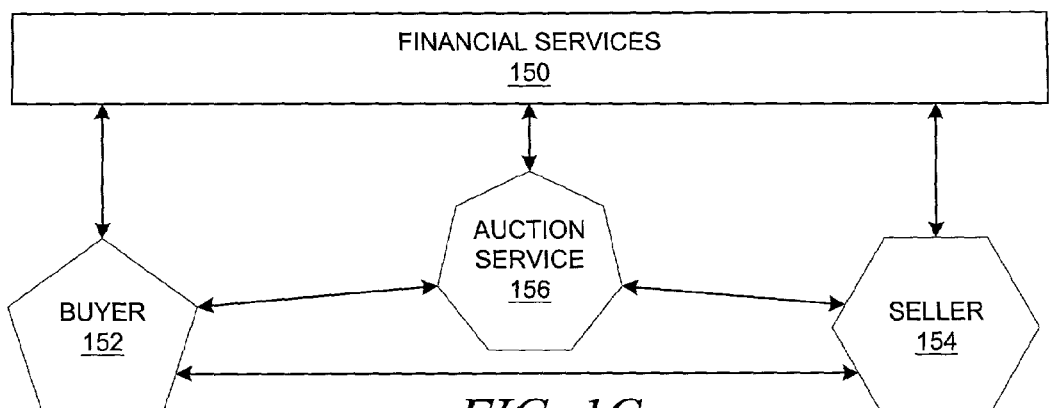
FIG. 1C is a block diagram depicting the parties that are involved in a typical electronic escrow service.

With reference now to FIG. 1C, a block diagram depicts the parties that are involved in a typical electronic auction service. Financial services 150 represents a financial infrastructure of banks, electronic payment services, credit card services, etc., that are used generally available to the public for transacting commerce with legal tender. Buyer 152, seller 154, and auction service 156 use financial services 150 as necessary or as appropriate to transact electronic commerce (e-commerce).

For example, at some point in time, auction service 156 assists in an online auction of a product or goods presented for sale by a seller. Seller 154 places an item for sale within the auction service by creating an online auction, which might require a variety of auction-related information, such as the time limit for the auction, the minimum bid price, the terms for handling shipment of the auctioned item, etc. Buyer 152 notifies auction service 156 when the buyer desires to place a bid on the product offered for sale by the seller. As part of the entire transaction, the auction service earns a fee, either by keeping a percentage of the purchase price or by charging the seller or the buyer a separate fee. The nature of the buyer and the seller are not relevant to the explanation of FIG. 1C nor to the present invention; either the buyer, the seller, or both, may be private individuals, private institutions, public institutions, corporations, partnerships, cooperatives, etc. Moreover, the nature of the goods or product with respect to explanation of FIG. 1C and the present invention is also irrelevant.

To accomplish the payment transfers amongst the parties, it can be assumed that the parties have agreed to one or more specific payment methods, which would involve the use of financial services 150 in some manner. Acceptable payment methods may include, but are not limited to, such valuable transfers as cash, checks, credit/debit cards, electronic funds transfers (EFTs), secure electronic transactions (SETs), digital micropayments, digital cash, and digital award program benefits. The electronic transfers may occur over various types of networks, such as network 101 shown in FIG. 1A.

To accomplish a transaction, all of the parties to the transaction may send and receive various types of communications, including electronic messages in various formats that are transmitted across various types of networks, such as telephone circuits or other types of networks, such as network 101 shown in FIG. 1A. For example, when negotiating a transaction, buyer 152 and seller 154 may exchange physical mail, electronic mail (e-mail), digital image files, etc.

Buyer 152 and/or seller 154 may register with auction service 156 to create an account that is used to initiate a formal transaction via auction service 156. To do so, the auction service may need to authenticate the account holder in some manner, and it may be assumed that the auction service can authenticate the user at least partially electronically through credit bureaus, credit card companies, or other institutions as necessary.

It may also be assumed that the auction service provides some type of electronic access to its services so that parties may create accounts and transact business with the auction service. For example, registered and non-registered users may access the auction service through the World Wide Web using browser-type applications on clients, such as the clients shown in FIG. 1A. The auction service may operate servers, similar to those shown in FIG. 1A, that provide Web pages that allow users to send and receive information to and from the auction service in a manner that is well-known in the art. Although the auction service may process electronic payments and may conduct some of its business through Internet-based or Web-based applications, it should be understood that the auction service may also accept payments and/or communications in other manners that do not use the Internet or other digital information services.

Figure 2:
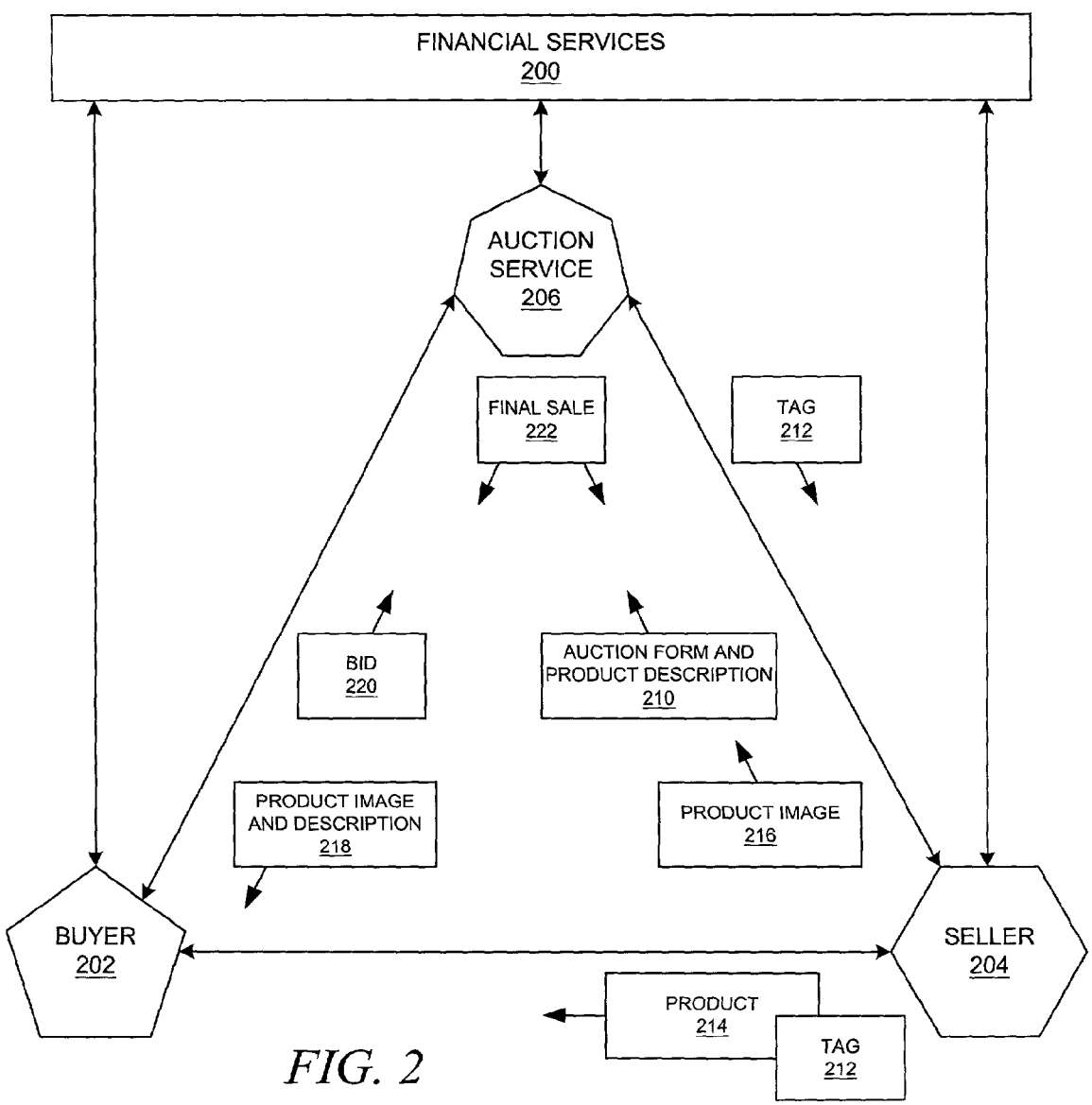
FIG. 2 is a block diagram depicting the parties that are involved in an electronic auction service and some of the information that flows between the parties in accordance with a preferred embodiment of the present invention.

With reference now to FIG. 2, a block diagram depicts the parties that are involved in an electronic auction service and some of the information that flows between the parties in accordance with a preferred embodiment of the present invention. The various steps involved in the present invention are described in more detail further below with respect to FIGS. 3A-3B.

In a manner similar to that previously described with respect to FIG. 1C, Financial services 200 represents a financial infrastructure of banks, electronic payment services, credit card services, etc., that are used generally available to the public for transacting commerce with legal tender. Buyer 202, seller 204, and auction service 206 use financial services 200 as necessary or as appropriate to transact electronic commerce (e-commerce). Auction service 206 earns a fee for completed purchase transactions, either by charging a percentage of the purchase price or by charging a separate fee for one or more parties to the transaction. In the present invention, While an auction service is shown in FIG. 2 as one example of an online service in which the present invention may be implemented, the present invention may be implemented in a variety of online services in which transactions to purchase goods may be initiated online.

Seller 204 initiates an auction by posting information about the item or goods for sale within auction form 210, which may contain a description of the goods. It is assumed that when an auction is initiated, the auction service generates some type of unique identifier for the auction, such as a unique serial number, that allows users of the auction service to refer to one of many concurrent auctions by the unique identifier. Hence, the description of the goods might be supplied by the seller at some later time by returning to the auction service and using the unique identifier to locate the seller's particular auction and to supply information concerning the auction at that later time.

In response to the creation of an auction by seller 204, auction service 206 sends the seller tag 212 to be placed on the product or goods being auctioned. The tag is described in more detail further below. Seller 204 places tag 212 on product 214 and takes a picture of product 214 with tag 212, after which seller 204 sends product image 216 to auction service 206 for placement within the seller's online auction of product 214.

At some later point in time, buyer 202 receives product image and description 218 while reviewing the seller's auction within the online auction service. As is well-known, the buyer may review online auctions by using a browser-type application to receive Web pages from a server operated as part of the online auction service, and the buyer views the Web pages on a display of a client machine. Other methods for operating the online auction service could be implemented.

If the buyer likes the product offered for auction by the seller, then the buyer may submit bid 220 to the online auction service. The auction service accepts bids for the duration of the bidding period, and at the conclusion of the time period for the auction, the auction service determines the highest bidder. The auction service then notifies seller 204 of final sale 222. Assuming that buyer 202 had submitted the highest bid, then buyer 202 is also notified of final sale 222. The final sale may be a document that is e-mailed or otherwise transmitted to the buyer and the seller; the buyer and the seller do not necessarily receive the same document or even the same information.

After receiving an indication that the buyer has paid for the product, possibly by placing the payment in escrow, then seller 204 ships product 214 with attached tag 212 to buyer 202. After receiving the goods, buyer 202 may inspect the goods, and the inspection is facilitated by comparing tag 212 with the tag that appears in the image of the goods that the buyer had previously received prior to placing a bid on the goods.

The present invention reduces the risks of the parties by inserting the tagging feature into the transaction. Auction service 206 may include the tagging service as part of the auction service without charge, or auction service 206 may earn a separate fee by charging a separate fee from the seller.

The tagging process provides a marking on the goods at the time that the goods were offered for auction, and tag should remain on the goods throughout the remainder of the transaction. The tag provides a mechanism by which the condition or type of goods that are being shipped between the parties should remain the same throughout the transaction. If an escrow service is being used, the escrow service does not release the escrowed payment until notified by the buyer that the goods that were received are of the type and in the condition as expected by the accompanying tag. The entire process is described in more detail with respect to the flowcharts shown in FIGS. 3A-3B.

Figure 3A:
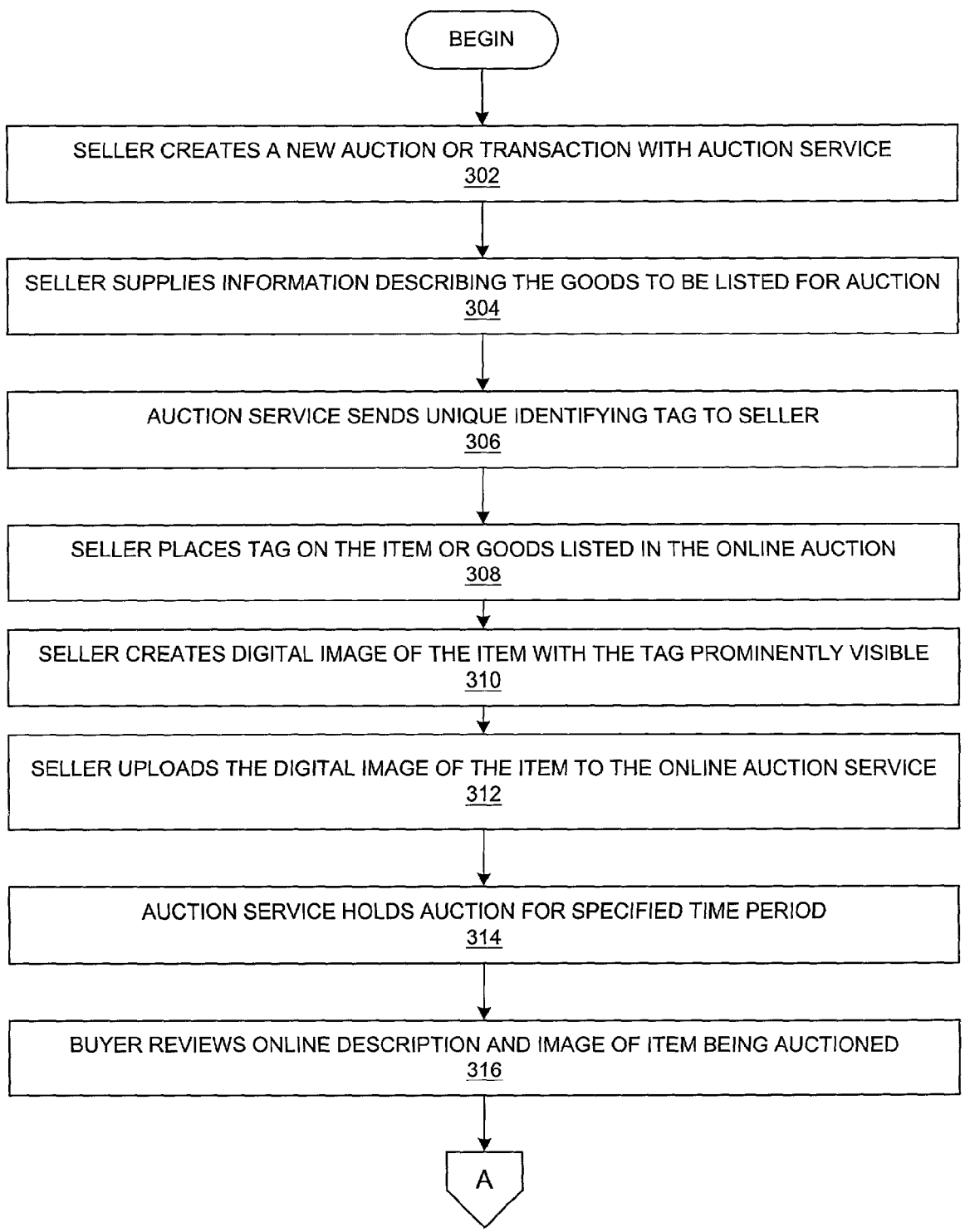
FIGS. 3A-3B are flowcharts depicting a process showing the operations or actions of the parties that are involved in an online transaction that uses a unique identification methodology in electronic commerce in accordance with a preferred embodiment of the present invention.
Figure 3B:
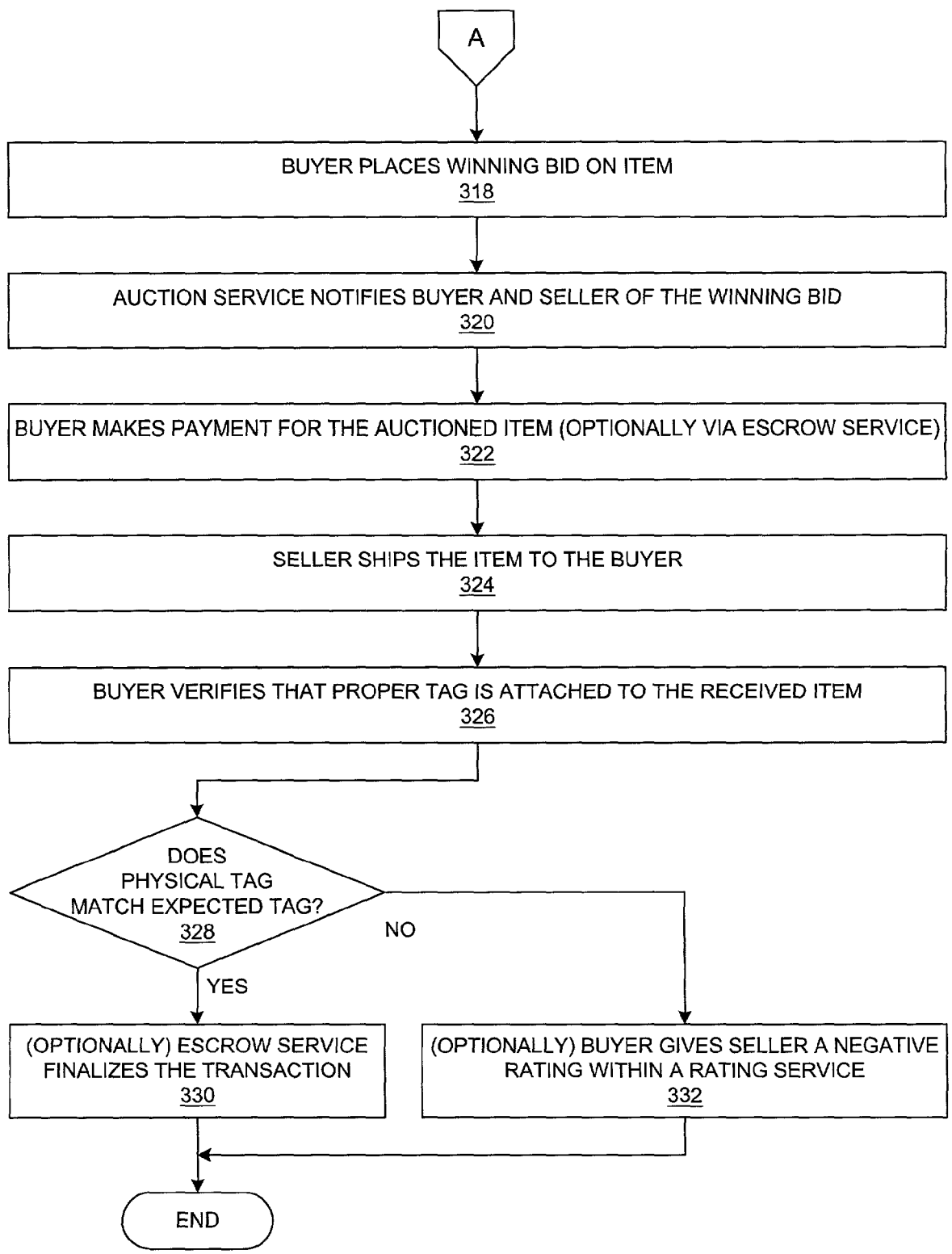

With reference now to FIGS. 3A-3B, a set of flowcharts depicts a process showing the operations or actions of the parties that are involved in an online transaction that uses a unique identification methodology in electronic commerce in accordance with a preferred embodiment of the present invention. In the prior art, after the seller accepts a final bid, the seller sends the auctioned goods or item to the buyer, and the seller eventually gets paid for the sale. In contrast with the prior art, the present invention inserts an electronically assisted tagging operation into the transaction.

The process begins with the seller creating a new auction or transaction within the auction service (step 302). For example, assuming that the auction service provides a Web site for handling the electronic actions, notifications, communications, etc., between the parties of an auction, then the seller logs into the auction service, e.g., by presenting the seller's auction service identifier and password or by presenting the proper credentials through a digital certificate using a browser-type application. The auction service would supply the seller with some form of transaction identifier for the newly created auction.

The seller then supplies information describing the goods to be listed in the auction (step 304). The seller may accomplish this by completing an electronic form with descriptive information and then submitted the form to the auction service.

In response, the auction service returns a unique identification tag to the seller (step 306). As noted above, the tagging feature may be free or the auction service may charge for the tagging service. Depending on the manner in which the tag is sent to the seller, the auction service may charge a different fee for each different method of using the transaction tag.

The transaction tag may be sent to the seller in several different ways. The tag may be a physical token, e.g., a tamper-resistant sticker, that has information printed on it, such as the time of the request, description of the item, and a unique transaction number that is presumably in an encrypted format, e.g., a cryptic series of numbers and letters. Alternatively, the tag may be sent to the seller as an electronic document to be printed by the seller.

For some sellers, it may be easiest for the tag to be received as a physical item through a regular postal delivery service or special delivery service. The auction service prints, makes, or otherwise generates the tag after the seller has completed the listing process and then mails the tag to the seller. It may be assumed that the additional time for mailing the tag is not intrusive because most sellers hold an auction over a period of several days, and assuming the tag is mailed promptly, the mailing process should only lengthen the auction process by two or three days. It may also be assumed that the cost of mailing the tag is minimal as the tag should easily fit within a regular envelope.

For other sellers, it may be easiest and most convenient to receive the transaction tag as an electronic document; the data format of the electronic document may vary depending on the implementation of the present invention. For example, the electronic document may be a specially encoded image that contains embedded information that is difficult to reproduce. In any case, the electronic document representing the tag would then be printed by the seller and attached to the goods or item to be auctioned. The tag could be printed on standard paper and then taped to the product, or the tag could be printed on special, tamper-resistant paper or stickers, similar to a sheet of peel-off labels.

Special, tamper-resistant stickers are commercially available. These sticker have several sub-portions; these stickers peel off a non-stick surface easily, but after the stickers are attached to an item, the stickers tend to self-destruct as the sub-portions separate from the item individually. Printing the transaction tags is then analogous to printing electronic stamps on a personal computer as is known in the art.

Other types of physical tokens may be used to attach the transaction tag to the item. For example, a plastic tag could have the transaction tag embossed, stamped, or printed upon it, and the plastic tag could be attached to the item with a tamper-resistant, one-way plastic tie. Various types of one-way plastic tags/ties are known in the art, such as plastic utility ties or those that are placed around the wrists of persons for identifying purposes. These stickers and/or tags could be supplied by the auction service for a fee.

The process continues when the seller attaches the tag to the item or goods listed in the online auction (step 308). Preferably, the transaction tag is somehow tamper-resistant so that if the seller somehow moves the transaction tag, the buyer can visually inspect the transaction tag and determine that the tag was not originally placed on the item that has been received by the buyer, as explained further below.

The seller then creates a digital image of the product with the attached tag prominently visible (step 310). If the seller does not have a digital camera, then the seller may capture a regular photograph of the tagged item and scan the photograph. In either case, a digital image is created in an appropriate format, and the seller uploads the digital image from a personal computer to a server operated by the auction service (step 312). It would be expected that the digital image would be associated with the appropriate online auction using the unique transaction identifier given to the seller when the seller previously created the online transaction.

The auction service then holds the auction for the appropriate time period (step 314), thereby allowing potential buyers to view the auction with its description of the item and the digital image of the tagged item (step 316). Assuming that a buyer has placed a winning bid on the tagged item (step 318), the auction service notifies the buyer and the seller of the winning bid in an appropriate manner, such as e-mail (step 320). It may be assumed that the notification contains various information items, such as a confirmation of the unique identification information that should appear on the transaction tag when the buyer receives the item.

After which the buyer makes a payment for the item, optionally using an escrow service to do so (step 322). Assuming that the buyer does not pay the seller directly for the purchase, then once the seller has been notified that the buyer has paid for the item, the seller physically ships the item to the buyer (step 324).

After the buyer receives the item or goods, the buyer verifies that the proper transaction tag is attached to the item (step 326). The information on the transaction tag should be identical to the information that was received in the winning-bid notification and in the digital image of the items that the buyer had previously viewed online. The tag facilitates the examination and verification process, including a potential dispute resolution process, by reducing the amount and characterization of information that must be matched between the physical item and the item that was previously offered for sale. If the received transaction tag does not match the transaction tag as it appears in the online digital image or in the winning-bid notification, then the buyer may have a prima facie case that the seller did not send the appropriate item to the buyer. Since it may be assumed that disreputable sellers would not subject themselves to a lower standard for the buyer's burden of proof of fraud, the transaction tags of the present invention allow a buyer to have more confidence that the purchase transaction can be completed without difficulty.

Continuing with the flowchart, a determination is made whether the transaction tag on the item matches the transaction tag in the digital image (step 328). If the buyer is satisfied, then the transaction is completed, such as having an escrow service finalize the transaction if an escrow service had been employed (step 330). If the buyer is not satisfied that the transaction tag on the item matches the expected tag, then the buyer can complain about the seller (step 332), either through the auction service or a separate ratings service. The process of initiating and finalizing an online auction transaction using the tagging methodology of the present invention is then complete.

The advantages of the present invention should be apparent in view of the detailed description of the invention that is provided above. An electronic transaction for physical goods between two physically distant parties increases the potential for fraud by removing the immediate physical inspection and transport of goods that occurs during traditional sales transactions. If fraudulent behavior occurs, the buyer may have very limited ability to receive just compensation. Prior art electronic services do not eliminate all potential types of fraudulent behavior.

The present invention provides a method and system for minimizing disputes between two physically distant parties that are participating in an electronic transaction for physical goods. The tagging methodology of the present invention reduces the ability of the seller to misrepresent the goods or the condition of the goods. The buyer has the additional protection and peace-of-mind that the seller cannot substitute the product after the sales transaction has been initiated unless the seller is completely dishonest and makes significant efforts to overcome the tamper-resistant barrier presented by the physical tag.

The present invention also complements an electronic rating system. If a seller consistently uses the present invention, then buyers may provide higher ratings for such sellers, thereby enticing more sellers to use the present invention.

The present invention is easy to use and should become more readily available and more widely used when digital cameras become more common and PC-based cameras become standard features of portable and desktop computers. The methodology of the present invention is particularly useful for selling any second-hand or used products in an online transaction and is not limited to auction services.

An increasing number of transactions are occurring through electronic commerce. As people get more comfortable with purchasing goods via the World Wide Web, the sale of more expensive items, such as cars, jewelry, furniture, etc., may migrate to the domain of electronic commerce. Even in transactions involving inexpensive goods, the present invention increases trust between parties in e-commerce transactions, after which parties may engage in more complex and expensive transfers of goods.

The tagging methodology provides a cost effective method for marking goods in a transaction, particularly within many countries in which service costs are relatively inexpensive compared to the cost of goods. In many countries, dispute resolution is prohibitively expensive, and it is assumed that the cost of the tagging service would be reasonable and attractive. The present invention is particularly much more cost effective for medium priced items, such as furniture, compared to prior art methods that require a physical inspection of a product, which adds significant transaction costs. The present invention reduces, to some extent, the need to use an escrow service to ensure that the buyer receives the expected goods, thereby eliminating another source of transaction costs. In the event of a dispute, the tag can be used by both the buyer and the seller as proof that the tag was attached to the actual item that was shipped and has not been substituted.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for processing a transaction in electronic commerce, the method comprising:
    receiving a transaction message at a computer system through a communication network from a seller, wherein the transaction message comprises a description of goods to be transferred during a transaction between a seller of the goods and a buyer of the goods;

creating a transaction tag to be associated with the goods during the transaction, wherein the transaction tag uniquely identifies the goods in the transaction, and wherein the transaction tag is a physical tag;

sending the transaction tag to the seller;

receiving, at a computer system through a communication network from the seller, a digital image to be associated with the transaction, wherein the digital image comprises an image of the goods on which the transaction tag has been attached, the transaction tag being visible within the digital image; and sending the digital image from a computer system through a communication network to one or more viewers.

2. The method of claim 1 further comprising:

accepting a bid from the buyer for the goods; and notifying the seller that the bid from the buyer is a winning bid in an online auction.

3. The method of claim 2 further comprising:

notifying the buyer that the bid from the buyer is the winning bid in the online auction; and in response to accepting payment for the goods from the buyer, notifying the seller of payment for the goods;

holding the payment in escrow.

4. The method of claim 3 further comprising:

receiving an acceptance message, wherein the acceptance message indicates an acceptance of goods received from the seller by the buyer; and releasing payment for the goods to the seller.

5. The method of claim 3 further comprising:

receiving a rejection message, wherein the rejection message indicates a rejection of goods received from the seller by the buyer; and returning payment for the goods to the buyer.

6. The method of claim 1 further comprising:

generating a transaction identifier for the transaction, wherein the transaction identifier provides an association between the transaction and electronic communication regarding the transaction.

7. The method of claim 1 further comprising:

generating encrypted information to be included on the transaction tag.

8. The method of claim 1 wherein the step of sending the transaction tag to the seller further comprises:

mailing the transaction tag to the seller.

9. A method for processing a transaction in electronic commerce, the method comprising:

generating a transaction message, wherein the transaction message comprises a description of goods to be transferred during a transaction between a seller of the goods and a buyer of the goods;

sending the transaction message to an online sales service that facilitates a purchase transaction between the buyer and the seller;

receiving a transaction tag to be associated with the goods during the transaction from the online sales service, wherein the transaction tag uniquely identifies the goods in the transaction, and wherein the transaction tag is a physical tag;

generating a digital image to be associated with the transaction, wherein the digital image comprises an image of the goods on which the transaction tag has been attached, the transaction tag being visible within the digital image; and sending the digital image to the online sales service.

10. The method of claim 9 further comprising:

receiving a transaction identifier for the transaction, wherein the transaction identifier provides an association between the transaction and electronic communication regarding the transaction.

11. An apparatus for processing a transaction in electronic commerce, the apparatus comprising:

first receiving means for receiving a transaction message from a seller, wherein the transaction message comprises a description of goods to be transferred during a transaction between a seller of the goods and a buyer of the goods;

creating means for creating a transaction tag to be associated with the goods during the transaction, wherein the transaction tag uniquely identifies the goods in the transaction, and wherein the transaction tag is a physical tag;

first sending means for sending the transaction tag to the seller;

second receiving means for receiving, from the seller, a digital image to be associated with the transaction, wherein the digital image comprises an image of the goods on which the transaction tag has been attached, the transaction tag being visible within the digital image; and second sending means for sending the digital image to one or more viewers.

12. The apparatus of claim 11 further comprising:

accepting means for accepting a bid from the buyer for the goods; and first notifying means for notifying the seller that the bid from the buyer is a winning bid in an online auction.

13. The apparatus of claim 11 further comprising:

second notifying means for notifying the buyer that the bid from the buyer is the winning bid in the online auction; and third notifying means for notifying, in response to accepting payment for the goods from the buyer, the seller of payment for the goods;

holding means for holding the payment in escrow.

14. The apparatus of claim 13 further comprising:

third receiving means for receiving an acceptance message, wherein the acceptance message indicates an acceptance of goods received from the seller by the buyer; and releasing means for releasing payment for the goods to the seller.

15. The apparatus of claim 13 further comprising:

fourth receiving means for receiving a rejection message, wherein the rejection message indicates a rejection of goods received from the seller by the buyer; and returning means for returning payment for the goods to the buyer.

16. The apparatus of claim 11 further comprising:

first generating means for generating a transaction identifier for the transaction, wherein the transaction identifier provides an association between the transaction and electronic communication regarding the transaction.

17. The apparatus of claim 11 further comprising:

second generating means for generating encrypted information to be included on the transaction tag.

18. The apparatus of claim 11 wherein the first sending means further comprises:

mailing means for mailing the transaction tag to the seller.

19. An apparatus for processing a transaction in electronic commerce, the apparatus comprising:

first generating means for generating a transaction message, wherein the transaction message comprises a description of goods to be transferred during a transaction between a seller of the goods and a buyer of the goods;

first sending means for sending the transaction message to an online sales service that facilitates a purchase transaction between the buyer and the seller;

first receiving means for receiving a transaction tag to be associated with the goods during the transaction from the online sales service, wherein the transaction tag uniquely identifies the goods in the transaction, and wherein the transaction tag is a physical tag;

second generating means for generating a digital image to be associated with the transaction, wherein the digital image comprises an image of the goods on which the transaction tag has been attached, the transaction tag being visible within the digital image; and second sending means for sending the digital image to the online sales service.

20. The apparatus of claim 19 further comprising:

second receiving means for receiving a transaction identifier for the transaction, wherein the transaction identifier provides an association between the transaction and electronic communication regarding the transaction.

21. A computer program product on a computer readable medium for use in a data processing system for processing a transaction in electronic commerce, the computer program product comprising:

instructions for receiving a transaction message from a seller, wherein the transaction message comprises a description of goods to be transferred during a transaction between a seller of the goods and a buyer of the goods;

instructions for creating a transaction tag to be associated with the goods during the transaction, wherein the transaction tag uniquely identifies the goods in the transaction, and wherein the transaction tag is a physical tag;

instructions for sending the transaction tag to the seller;

instructions for receiving, from the seller, a digital image to be associated with the transaction, wherein the digital image comprises an image of the goods on which the transaction tag has been attached, the transaction tag being visible within the digital image; and instructions for sending the digital image to one or more viewers.

22. The computer program product of claim 21 further comprising:

instructions for accepting a bid from the buyer for the goods; and instructions for notifying the seller that the bid from the buyer is a winning bid in an online auction.

23. The computer program product of claim 22 further comprising:

instructions for notifying the buyer that the bid from the buyer is the winning bid in the online auction; and instructions for notifying the seller of payment for the goods in response to accepting payment for the goods from the buyer;

instructions for holding the payment in escrow.

24. The computer program product of claim 23 further comprising:

instructions for receiving an acceptance message, wherein the acceptance message indicates an acceptance of goods received from the seller by the buyer; and instructions for releasing payment for the goods to the seller.

25. The computer program product of claim 23 further comprising:

instructions for receiving a rejection message, wherein the rejection message indicates a rejection of goods received from the seller by the buyer; and instructions for returning payment for the goods to the buyer.

26. The computer program product of claim 21 further comprising:

instructions for generating a transaction identifier for the transaction, wherein the transaction identifier provides an association between the transaction and electronic communication regarding the transaction.

27. The computer program product of claim 21 further comprising:

instructions for generating encrypted information to be included on the transaction tag.

28. The computer program product of claim 21 wherein the instructions for sending the transaction tag to the seller further comprise:

instructions for mailing the transaction tag to the seller.

29. A computer program product on a computer readable medium for use in a data processing system for processing a transaction in electronic commerce, the computer program product comprising:

instructions for generating a transaction message, wherein the transaction message comprises a description of goods to be transferred during a transaction between a seller of the goods and a buyer of the goods;

instructions for sending the transaction message to an online sales service that facilitates a purchase transaction between the buyer and the seller;

instructions for receiving a transaction tag to be associated with the goods during the transaction from the online sales service, wherein the transaction tag uniquely identifies the goods in the transaction, and wherein the transaction tag is a physical tag;

instructions for generating a digital image to be associated with the transaction, wherein the digital image comprises an image of the goods on which the transaction tag has been attached, the transaction tag being visible within the digital image; and instructions for sending the digital image to the online sales service.

30. The computer program product of claim 29 further comprising:

instructions for receiving a transaction identifier for the transaction, wherein the transaction identifier provides an association between the transaction and electronic communication regarding the transaction.

* * * * *